(12) United States Patent
Middelberg et al.

(10) Patent No.: US 7,845,844 B2
(45) Date of Patent: Dec. 7, 2010

(54) DIRECTLY DRIVEN EXTRUDER WITH AN ADAPTER

(75) Inventors: Gerhard Middelberg, Lengerich (DE); Werner Hülsmeier, Lengerich (DE); Hans-Udo Beckmann, Ludenscheid (DE)

(73) Assignee: Windmoeller & Hoelscher KG, Lengerich (DE)

( * ) Notice: Subject to any disclaimer, the term of this patent is extended or adjusted under 35 U.S.C. 154(b) by 881 days.

(21) Appl. No.: 10/582,486

(22) PCT Filed: Nov. 24, 2004

(86) PCT No.: PCT/EP2004/013293

§ 371 (c)(1), (2), (4) Date: Jun. 12, 2006

(87) PCT Pub. No.: WO2005/058579

PCT Pub. Date: Jun. 30, 2005

(65) Prior Publication Data

US 2007/0166421 A1 Jul. 19, 2007

(30) Foreign Application Priority Data

Dec. 11, 2003 (DE) ................................ 103 57 884

(51) Int. Cl.
*B29B 7/42* (2006.01)
(52) U.S. Cl. .................... 366/100; 425/162; 425/532
(58) Field of Classification Search ............... 366/100; 425/162, 532
See application file for complete search history.

(56) References Cited

U.S. PATENT DOCUMENTS

| 3,802,670 | A | 4/1974 | Okada et al. |
| 5,891,485 | A | 4/1999 | Emoto |
| 6,632,009 | B2 | 10/2003 | Meyer |
| 7,090,483 | B2 * | 8/2006 | Middelberg ............... 425/162 |
| 2002/0064084 | A1 * | 5/2002 | Meyer ....................... 366/100 |
| 2003/0012838 | A1 * | 1/2003 | Middelberg ............... 425/162 |
| 2004/0223403 | A1 | 11/2004 | Schunk et al. |

FOREIGN PATENT DOCUMENTS

| DE | 4 430 176 A1 | 2/1996 |
| DE | 697 03 535 T2 | 6/2001 |
| DE | 103 29 035 A1 | 1/2005 |
| EP | 0 882 564 B1 | 11/2000 |
| EP | 1 182 027 B1 | 2/2002 |
| WO | WO 2004/005005 A1 | 1/2004 |

* cited by examiner

*Primary Examiner*—David L Sorkin
(74) *Attorney, Agent, or Firm*—Jacobson Holman PLLC

(57) ABSTRACT

An extruder device includes an extruder worm and a worm drive that has a drive motor, which is provided with a rotor. The rotor is connected to the extruder worm during operation in such a way that the rotor and extruder worm rotate at the same speed during operation. The rotor can be connected to detachable torque-transmitting elements which transmit torque between the rotor and the extruder worm and which can be detached when refitting occurs. The detachable torque-transmitting elements include a torque-transmission point at which torque is transmitted from a bushing to a connecting section which is at least partially encompassed by the bushing. The torque-transmission point in an axial direction is located outside the rotor.

9 Claims, 5 Drawing Sheets

DIRECTLY DRIVEN EXTRUDER WITH AN ADAPTER

CROSS-REFERENCE TO RELATED APPLICATION

This is a nationalization of PCT/EP04/013293 filed Nov. 24, 2004 and published in German.

BACKGROUND OF THE INVENTION

1. Field of Invention

The invention relates to an extruder device.

2. Description of the Prior Art

Conventional extruder devices exhibit an extruder worm; and said devices are driven by a worm drive by means of a gear transmission unit. However, such gear transmission units are mechanically complicated and maintenance intensive, so that recently attempts have been made to drive the extruder worms directly—that is, without a gear transmission unit.

With the emergence of the so-called hollow shaft motors, it is now possible to build such directly driven extruder devices with smaller dimensions. Thus, for example, EP 1 182 027 A1 proposes an extrusion device, wherein the extruder worm exhibits a connecting section, which is inserted into a bushing and then is or will be connected to the same so as to be rotationally rigid. Therefore, the connecting section and the bushing are surrounded by the aforesaid hollow shaft motor, which can transfer the drive torque, generated by said motor, to the bushing by means of the torque-transmitting elements. Due to the fact that the hollow shaft motor surrounds the connecting section of the extruder worm, the overall length of the entire extrusion device is relatively short.

However, the drawback with this construction is that the torque-transmitting elements are difficult to access. Hence, the advantage of the somewhat shorter overall length is more than frustrated by longer continual maintenance work.

Therefore, the object of the present invention is to improve a prior art gearless extrusion device in such a manner that the torque-transmitting elements are easier to access.

SUMMARY OF THE INVENTION

The problem is solved by the features of the various embodiments of the invention as described herein.

According to said characterizing part, the torque-transmitting elements in the axial direction are located outside the rotor. In this manner the torque-transmitting elements are easy to reach without having to remove the hollow shaft motor with its outer stator and internal rotor. In the language of the present document a connecting section is defined as any continuation or extension of the extruder worm. Therefore, it is irrelevant whether this connecting section is stamped as one piece with the extruder worm or is connected mechanically to the same.

In another design of the invention the torque-transmitting elements are arranged between the extruder worm and the drive motor in order to use an extruder worm with a connecting section that is as short as possible.

It is advantageous if the torque-transmitting elements include a screw connection that runs in the axial direction and with which the bushing and the connecting section can be connected so as to be rotationally rigid. In this case the bushing and the connecting section can be quickly disconnected without any complications. This screw connection can be easily reached through the hollow shaft of the drive motor.

Another advantageous design of the invention provides that at least one of the torque-transmitting elements is at least partially encompassed by a housing, which is rigidly connected to the housing of the extruder worm. Therefore, it is possible to protect the torque-transmitting elements against external interference factors, such as dust. In addition, this housing can also be attached detachably to the housing of the drive motor with the housing. Then all of the elements of the extruder device form a unit that can then be designed, for example, so as to be moveable.

Furthermore, it is especially advantageous if one of the torque-transmitting elements is braced against the encompassing housing by means of roller bearings and/or ball bearings. Experiments have shown that during operation considerable forces, which must be absorbed with suitable bearings, act on the extruder worm. If conventional hollow shaft motors, the bearings of which are not designed for the forces prevailing in extruders, are used, then frequent bearing damage must be expected. In contrast, a structural adaptation of the hollow shaft motors to the said demands would result in very high costs, for which reason this solution would be disadvantageous.

The roller bearings that are used are advantageously angular contact bearings that are capable of absorbing the axial forces. Furthermore, they are self-centering.

BRIEF DESCRIPTION OF THE DRAWINGS

Other embodiments of the invention are disclosed in the dependent claims and the drawings. In the drawings.

DETAILED DESCRIPTION OF THE PREFERRED EMBODIMENTS

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

Figure 1:
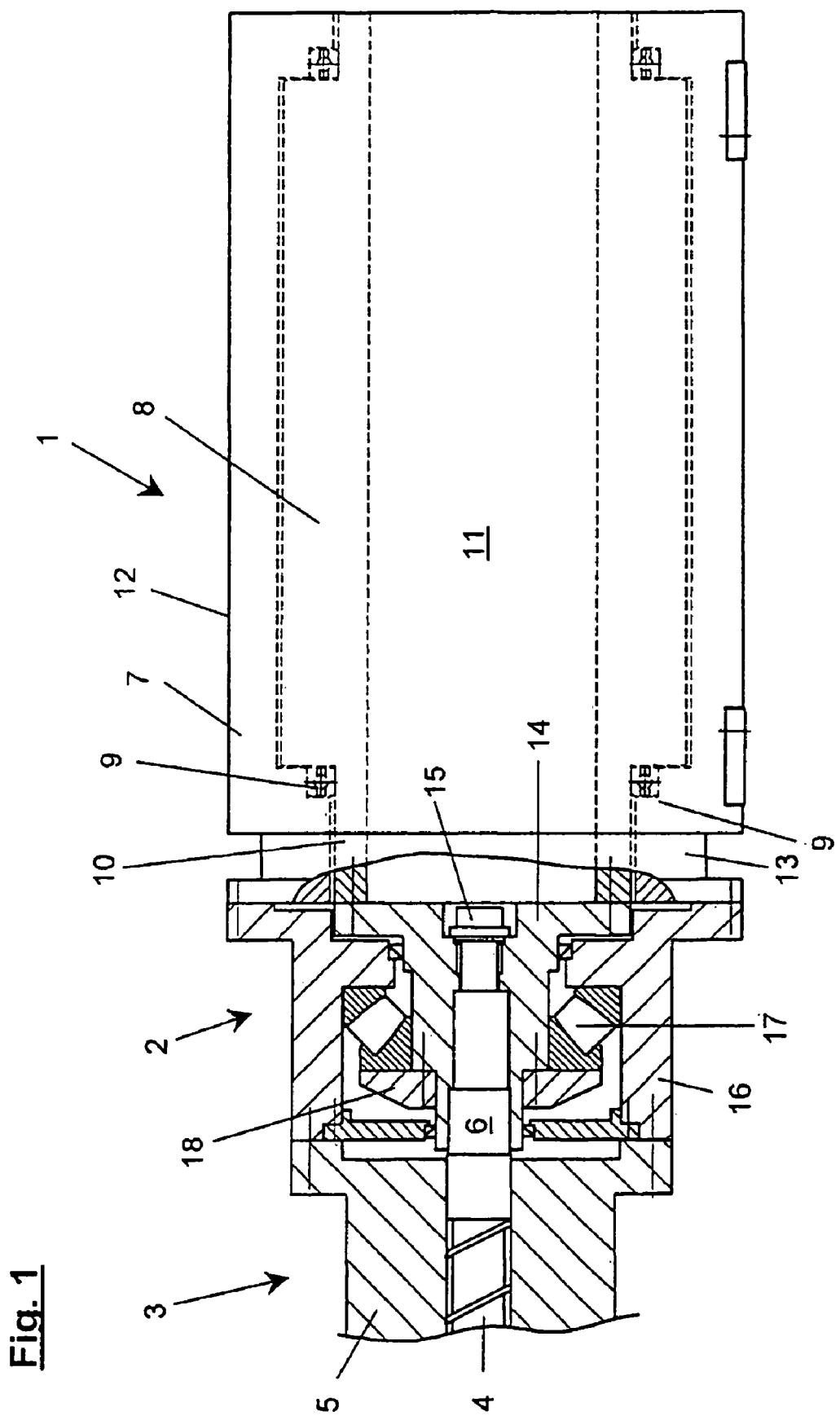
FIG. 1 shows an extruder device, according to the invention.

FIG. 1 depicts an inventive extruder device, which comprises a drive motor 1, torque-transmitting elements, all of which are labeled 2, and an extruder 3. The extruder 3 comprises, as customary in everyday practice, essentially an extruder worm 4, which is mounted rotatably in an extruder housing 5. The motor 1 comprises a stator 7, which is surrounded by a motor housing 12, and a rotor 8, which is braced against the stator 7 by means of the radial bearing 9. The rotor 8 is like a hollow shaft so that it exhibits a tube-shaped interior 11. Furthermore, the rotor 8 includes an extension 10, which projects beyond the stator 7 and is surrounded by a housing extension 13.

To transmit the torque, generated by the drive motor 1, to the extruder worm 4, a bushing 14 is attached on the face side to the extension 10 of the rotor 8. This connection is rotationally rigid and can be made by means of not only a screw connection but also by means of a snap-in connection. This bushing 14 envelops the connecting section 6 of the extruder worm 4. To transmit the torque at the bushing 14 to the extruder worm 4, its connecting section 6 is screwed to the bushing 14 with a screw 15 so as to be rotationally rigid. The rotational rigidity is achieved chiefly by a groove-spring system or an equivalent system between the connecting section 6 and the bushing 14. Of course, a plurality of screws can also be provided. These screws 15 can be easily reached from the side, which belongs to the drive motor 1 and which faces away from the extruder 3, through the tubular interior 11 of said motor. The connecting section 6 is braced against the bushing 14 in the axial direction by way of ring steps, so that the bushing 14 and the connecting section 6 cannot be moved relative to each other in the axial direction. The connection of the bushing 14 and the connecting section 6 can be detached, for example, for maintenance work. As soon as the connection has been detached, the extruder worm 4 can be pulled out of the extruder housing 5 in the direction of the drive motor 1.

The bushing 14 and the connecting section 6 are encompassed by a housing 16. The various housings 5, 13, 16 and 12 are connected together so that they form a housing unit. The housing 16 envelops a roller bearing 17, against which the bushing 14 is braced in turn. In addition, a ring 18 is fastened to the bushing 14, so that the bushing 14 is positioned in such a manner relative to the housing 16 that said bushing cannot be displaced. At this point it would be worth mentioning that during operation the pressure, issuing from the extruder worm 4, runs in the axial direction to the drive. Therefore, the roller bearing 17 is capable of absorbing the axial forces occurring at the extruder worm 4.

Figure 2:
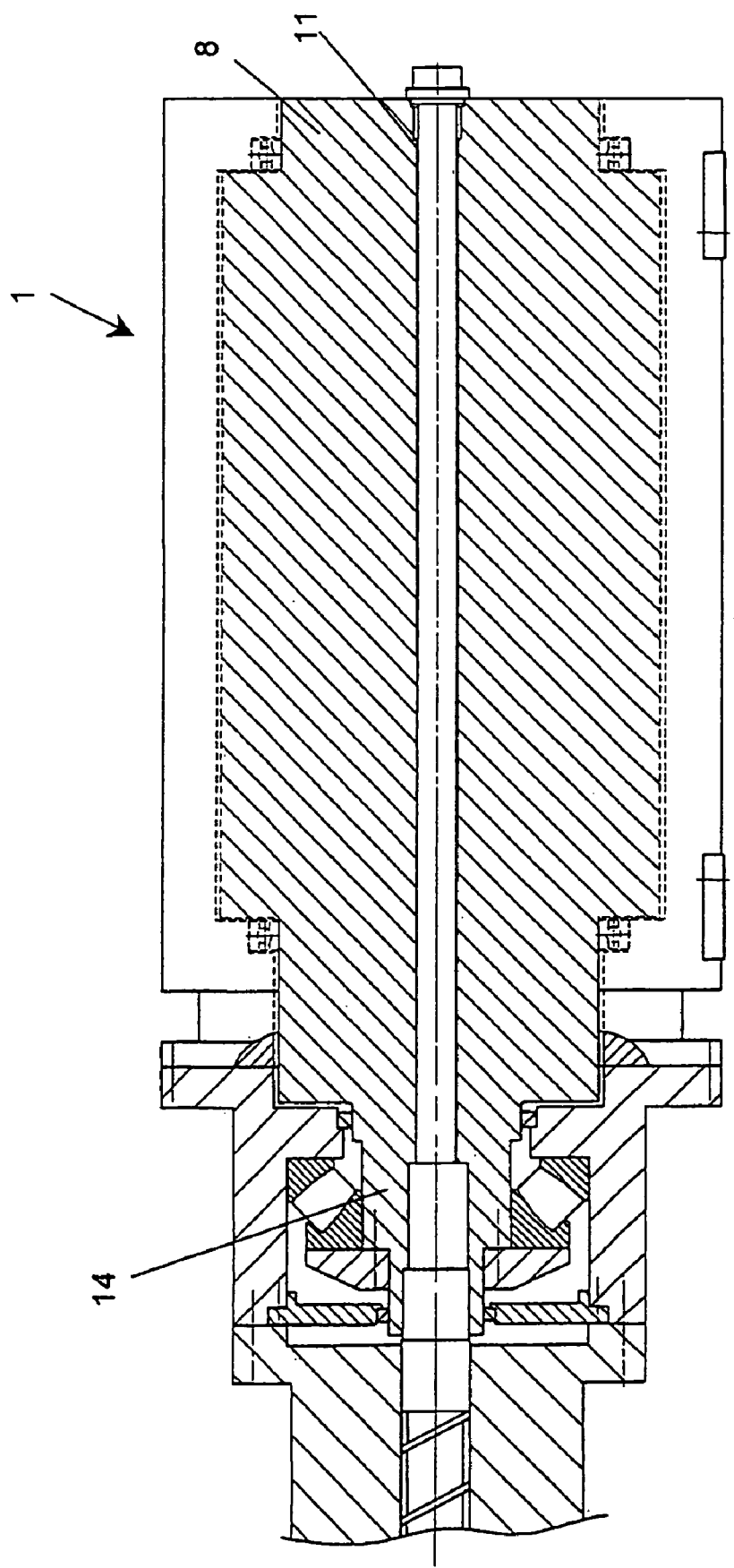
FIG. 2 shows an inventive extruder device with a drive motor with a solid shaft.

FIG. 2 depicts an embodiment of the invention with a drive motor 1 with a solid shaft, into which a tubular interior 11 was bored. The diameter of said shaft is sufficient to receive the screw 25, which, in contrast to the screw 15, illustrated in FIG. 1, is long enough to extend through the drive motor 1. In this embodiment the bushing 14 and the rotor 8 are made as one piece. However, in comparison to the embodiment shown in FIG. 1, the function of the individual components is kept.

Figure 3:
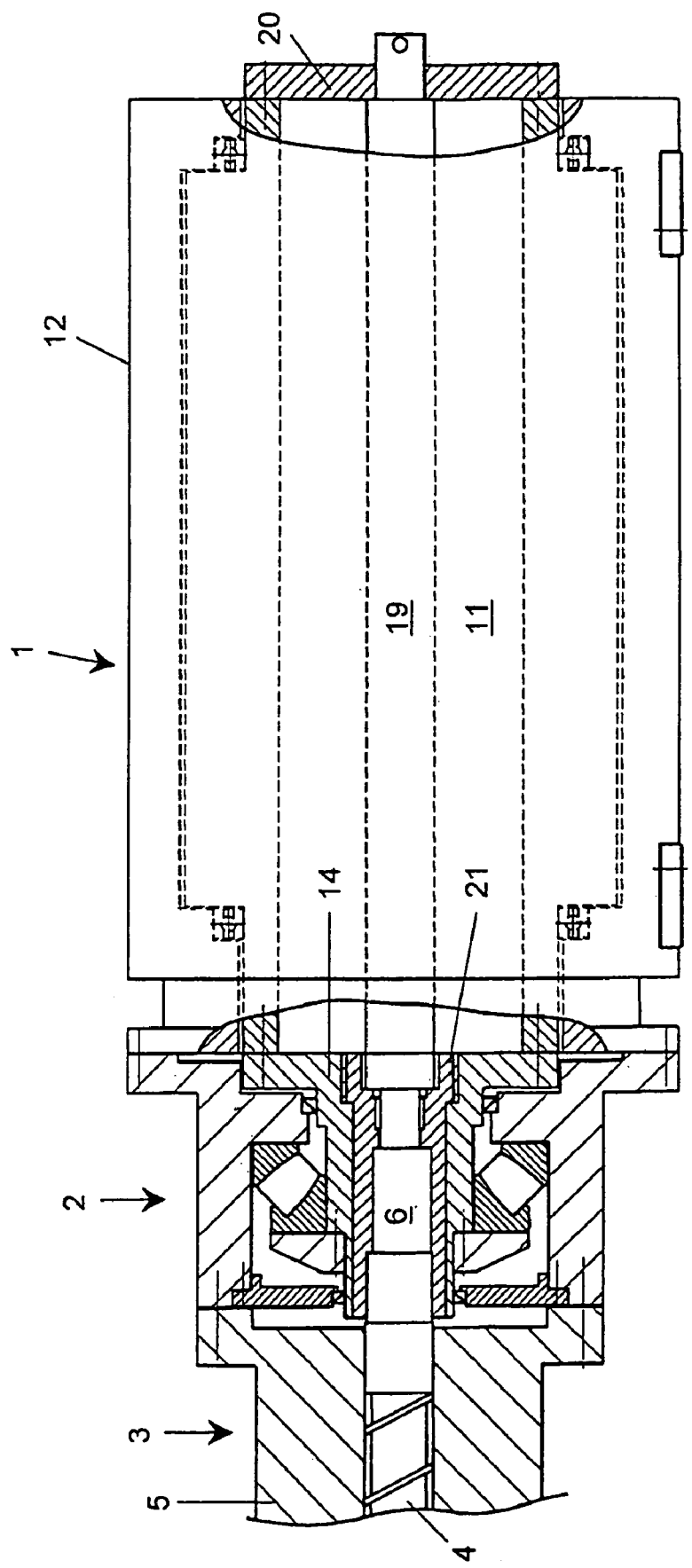
FIG. 3 shows an identical extruder device with an additional sleeve.

FIG. 3 depicts an embodiment of the present invention that is very similar to the one shown in FIG. 1. In this case, an intermediate bushing 21 is fastened inside the bushing 14 so as to be rotationally rigid. At the same time the intermediate bushing 21 can be screwed into the bushing 14 or be connected to the same by means of a groove-spring system. Therefore, the connecting section 6 of the extruder worm 4 is braced against the intermediate bushing 21 by means of the ring steps. In this configuration the extruder worm 4 and the intermediate bushing 21 can be pulled out of the extruder housing 5 through the tubular interior 11 of the drive motor 1. Furthermore, compared to the embodiment presented in FIG. 1, the screw 15 has been replaced with a bolt 19. This bolt 19 extends at least through the entire tubular interior of the drive motor 1 and exhibits, analogous to the screw, a thread on one end so that with this bolt 19 a rotationally rigid connection between the connecting section 6 of the extruder worm 4 and the bushing 14 can be made.

The diameter of the end of the bolt 19 that is located opposite the thread can be made smaller. A sleeve 20, which in turn is fastened to the motor housing 12, can be slid on this thinner section. In this way an abutment is formed, by means of which the bolt 19 can brace the intermediate bushing 21.

Figure 4:
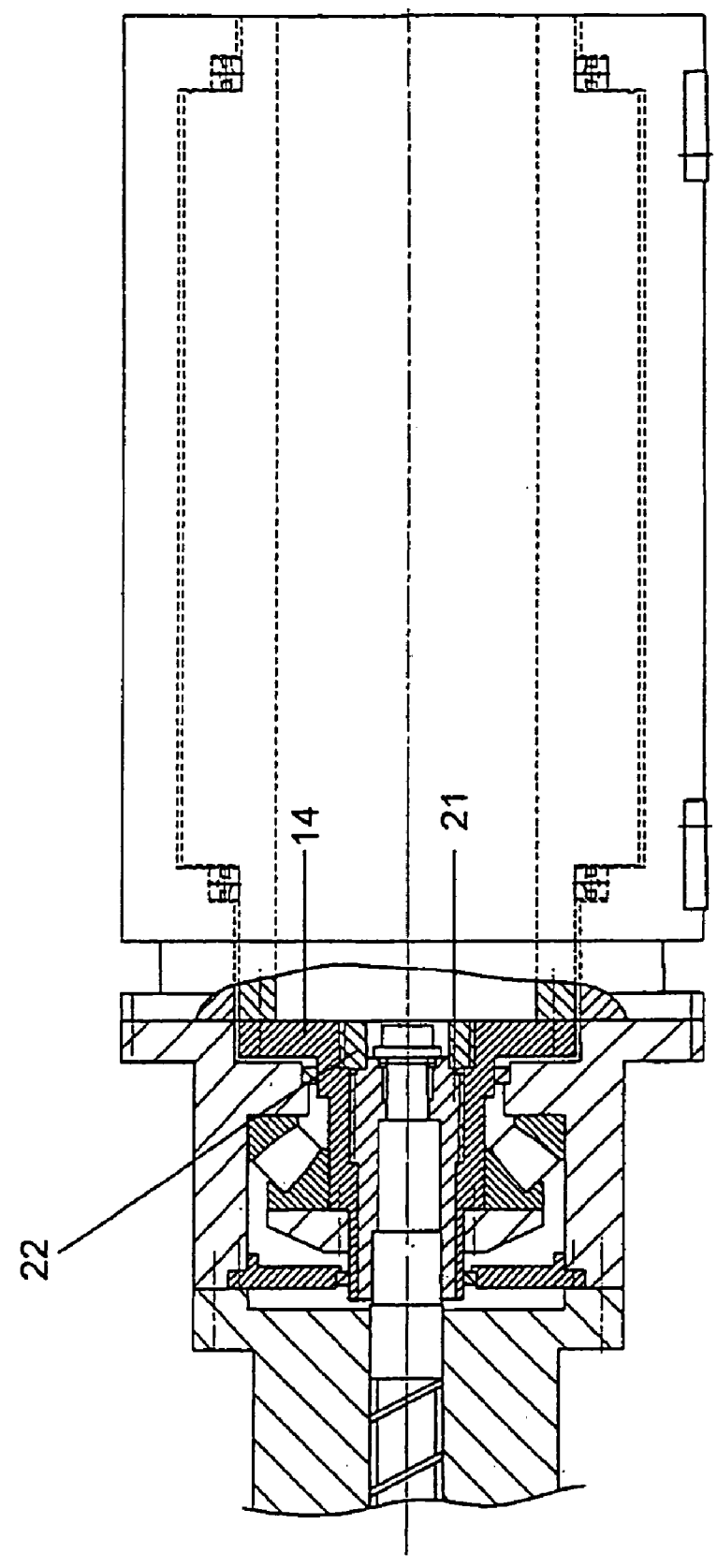
FIG. 4 shows another embodiment of the extruder device of the invention.

FIG. 4 depicts an extruder device with an intermediate bushing 21, as shown previously in FIG. 3. To prevent the intermediate bushing 21 from moving axially inside the bushing 14, a lock washer 22 is screwed into said bushing.

Figure 5:
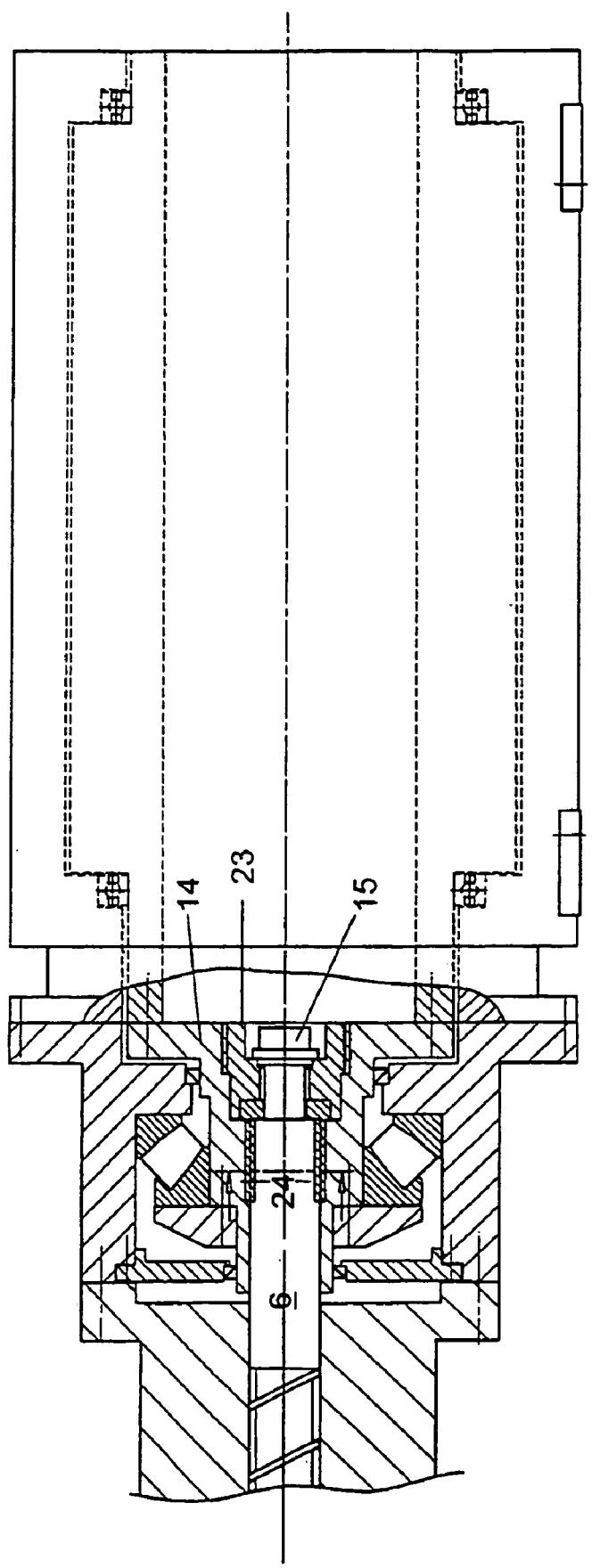
FIG. 5 shows another embodiment of the extruder device of the invention.

The extruder device, shown in FIG. 5, is similar to the one shown in FIG. 1. In this case the connecting section 6 and the bushing 14 are connected together by means of locking pins 24 so as to be twist-proof. Since these locking pins 24 can be moved in the axial direction, they are fixed in position by the lock washer 23, which is fastened, for example screwed, in the bushing 14. Then the connecting section with the bushing can be connected with the screw 15.

The invention being thus described, it will be apparent that the same may be varied in many ways. Such variations are not to be regarded as a departure from the spirit and scope of the invention, and all such modifications as would be recognized by one skilled in the art are intended to be included within the scope of the following claims.

LIST OF REFERENCE NUMERALS

| | List of Reference Numerals |
|---|---|
| 1 | drive motor |
| 2 | torque-transmitting elements |
| 3 | extruder |
| 4 | extruder worm |
| 5 | extruder housing |
| 6 | connecting section |
| 7 | stator |
| 8 | rotor |
| 9 | radial bearing |
| 10 | extension |
| 11 | tubular interior |
| 12 | motor housing |
| 13 | housing extension |
| 14 | bushing |
| 15 | screw |
| 16 | housing |
| 17 | roller bearing |
| 18 | ring |
| 19 | bolt |
| 20 | sleeve |
| 21 | intermediate bushing |
| 22 | lock washer |
| 23 | lock washer |
| 24 | locking pin |
| 25 | |
| 26 | |
| 27 | |
| 28 | |
| 29 | |
| 30 | |

What is claimed is:

1. An extruder device comprising an extruder worm and a worm drive, said worm drive including a drive motor which includes a rotor which during operation is connected to the extruder worm such that the rotor and the extruder worm rotate at a same speed during operation and are connected to detachable torque-transmitting elements which transmit torque between the rotor and the extruder worm and which are detachable therefrom, the detachable torque-transmitting elements (i) being arranged between the motor and the extruder worm and (ii) including a torque transmission interface at which torque is transmitted from a bushing fastened on a face side of the rotor to a connecting section that is at least partially encompassed by the bushing, the torque transmission interface, the bushing, and the connecting section being located, in an axial direction, completely outside the rotor.

2. The extruder device as claimed in claim 1, wherein at least one of the torque-transmitting elements is at least partially encompassed by a housing, which is rigidly connected to a housing of the extruder worm.

3. The extruder device as claimed in claim 2, wherein a housing of the drive motor is connected detachably to the housing, which at least partially encompasses the torque-transmitting elements.

4. The extruder device as claimed in claim 2, wherein at least one of the torque-transmitting elements is braced against the encompassing housing by at least one of roller bearings and ball bearings.

5. The extruder device as claimed in claim 4, wherein the roller bearing is an angular contact bearing which absorbs axial forces.

6. The extruder device as claimed in claim 5, wherein said at least one torque-transmitting element is the bushing.

7. The extruder device as claimed in claim 4, wherein said at least one torque-transmitting is the bushing.

8. The extruder device according to claim 1, further comprising a motor housing and an extruder housing, with the detachable torque-transmitting elements being arranged therebetween.

9. The extruder device according to claim 1, wherein the torque-transmitting elements include a screw connection that extends in the axial direction and with which the bushing and the connecting section are connected so as to be rotationally rigid.

* * * * *